United States Patent [19]

Ohashi

[11] Patent Number: 4,483,413

[45] Date of Patent: Nov. 20, 1984

[54] SOUND ABSORBER SUPPORTING STRUCTURE FOR AN AUTOMOTIVE AIR INTAKE BOX

[75] Inventor: Toshio Ohashi, Yokohama, Japan

[73] Assignee: Nissan Motor Company, Limited, Yokohama, Japan

[21] Appl. No.: 448,762

[22] Filed: Dec. 10, 1982

[30] Foreign Application Priority Data

Jan. 28, 1982 [JP] Japan .................................. 57/10887

[51] Int. Cl.³ ............................................ E04F 17/04
[52] U.S. Cl. .................................................. 181/224
[58] Field of Search ............... 181/198, 205, 217, 222, 181/224, 229, 284, 175; 350/311; 354/295

[56] References Cited

U.S. PATENT DOCUMENTS

| | | | |
|---|---|---|---|
| 2,427,698 | 9/1947 | Arnhym | 181/224 X |
| 3,528,725 | 9/1970 | Barkley | 350/311 X |
| 4,120,376 | 10/1978 | Palmer | 181/284 X |
| 4,383,735 | 5/1983 | Stravitz | 354/295 X |

FOREIGN PATENT DOCUMENTS 2834267  9/1980  Fed. Rep. of Germany ...... 181/224

Primary Examiner—Donald A. Griffin
Attorney, Agent, or Firm—Schwartz, Jeffery, Schwaab, Mack, Blumenthal & Koch

[57] ABSTRACT

In a sound absorber supporting structure for an automotive air intake box, means are provided for enabling sound absorbers to be removably inserted along the inner surfaces of the side walls of an inside air—outside air changeover unit; and retainer means are provided in association with said side walls, whereby the sound absorbers, when inserted as mentioned above, are securely retained in position between the side walls and the retainer means.

12 Claims, 6 Drawing Figures

SOUND ABSORBER SUPPORTING STRUCTURE FOR AN AUTOMOTIVE AIR INTAKE BOX

BACKGROUND OF THE INVENTION

1. Field of the Invention

This invention relates to a sound absorber supporting structure of an air intake box for selectively introducing inside air or outside air into an automotive air conditioner.

2. Description of the Prior Art

Automotive air conditioners such as that shown in FIG. 1 are known, which comprise an air intake box I including an air intake door 1 adapted to switchingly effect outside air introduction or inside air circulation, and a blower 2; a cooling unit C including an evaporator 3 for causing a coolant to be evaporated during cooling operation; a heater unit H including a heater core 4 through which cooling water heated by the engine is circulated; and an air mix door 5 arranged to control the quantity of air passed to the heater core.

In the air intake box I provided in the foregoing conventional automotive air conditioner, as shown in FIGS. 2 and 3, an electric motor 8 is mounted on a bracket 7 fixedly attached to the bottom of a blower housing 6; the blower 2 is mounted at the upper end of the rotary shaft of the motor 8 and accommodated in the blower housing 6; and a cooling duct 10 is connected at one end thereof to the aforementioned bracket 7 and extended as far as the motor 8. Furthermore, in order that acoustic vibration or sound are not perceived as noise in the vehicle compartment, a pair of sound absorber membranes 15, which may be formed by compression-molding of glass fiber or the like into a rectangular shape, are provided on the inner surfaces of left and right side walls 13 of an inside air—outside air changeover unit 11, as shown in FIGS. 2 and 3. Denoted at 14 are inside air inlet ports formed in a part of the inside air—outside air changeover unit 11.

With the aforementioned conventional arrangement, however, difficulties have been experienced in mounting the sound absorber membranes 15. Such membranes are adhered directly to the inner surfaces of the left and right hand side walls 13 of the inside air—outside air changeover unit 11 by applying an adhesive agent onto one surface of each membrane 15. Another disadvantage is such that the sound absorber membranes 15 tend to peel off the respective side walls 13 due to aging of the adhesive agent. If the sound absorbers should peel off, then the air intake door 1 would possibly be immovably caught by the membranes so that the silencing effect would significantly be decreased.

SUMMARY OF THE INVENTION

Accordingly, it is an object of the present invention to provide a novel and improved sound absorber supporting structure for an air intake box of an automotive air conditioner, wherein the sound absorbers are prevented from peeling off by providing in the air intake box means for positively retaining the sound absorbers in position, thereby eliminating the aforementioned problems with the prior art.

Briefly, according to the present invention, means for retaining sound absorbers is provided in association with each side wall of an inside air—outside air changeover unit in the air intake box, and the sound absorbers, when inserted along the inner surfaces of the side walls, are retained in position between the aforementioned retainer means and the side walls.

Other objects, features and advantages of the present invention will become apparent from the ensuing description taken in conjunction with the accompanying drawings.

DESCRIPTION OF THE PREFERRED EMBODIMENTS

Figure 1:
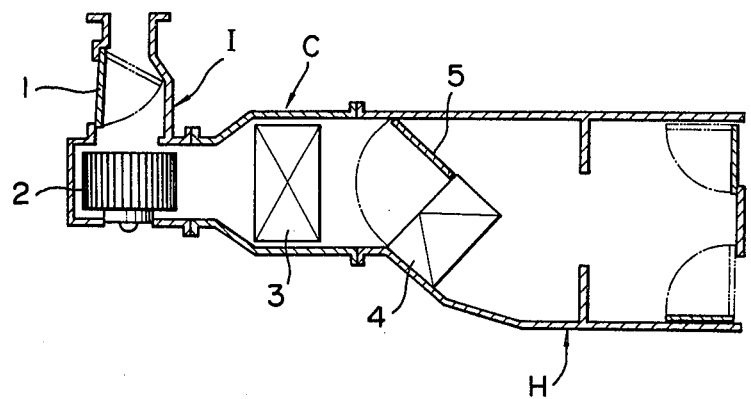
FIG. 1 is a schematic sectional view showing an example of the conventional automotive air conditioner.
Figure 3:
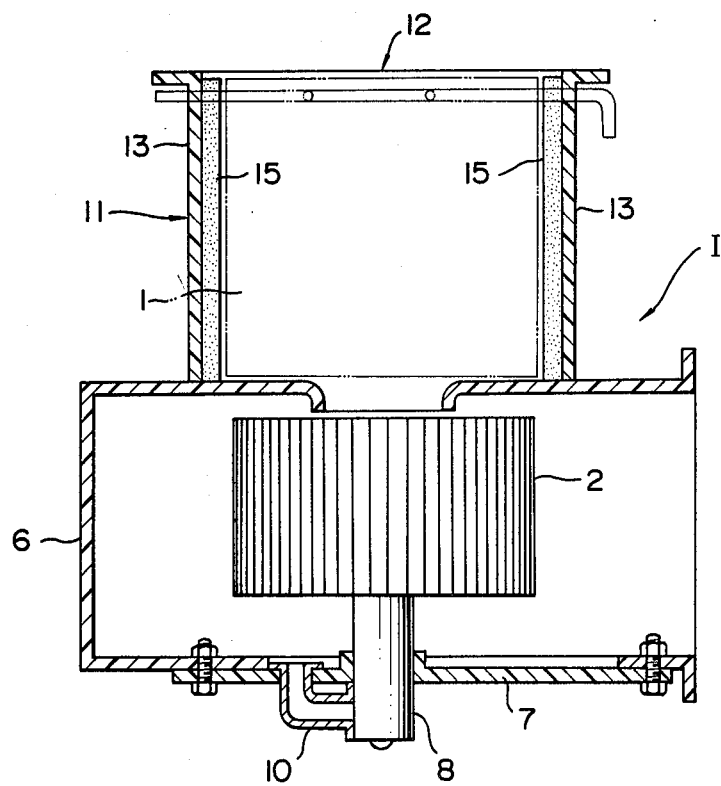
FIG. 3 is a sectional view taken along the lines III—III of FIG. 2.
Figure 2:
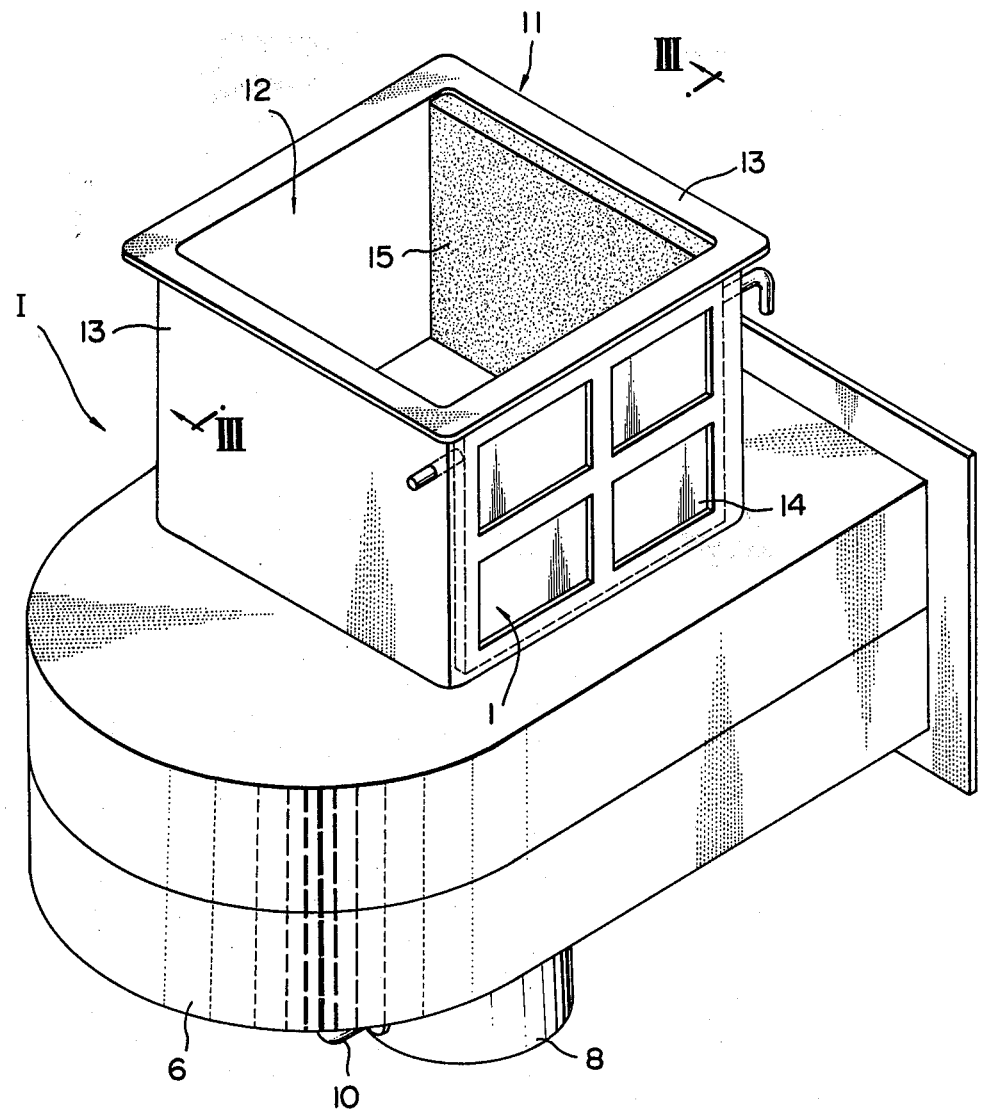
FIG. 2 is a perspective view of the conventional air intake box, illustrating an example of the sound absorber mounting structure thereof.
Figure 4:
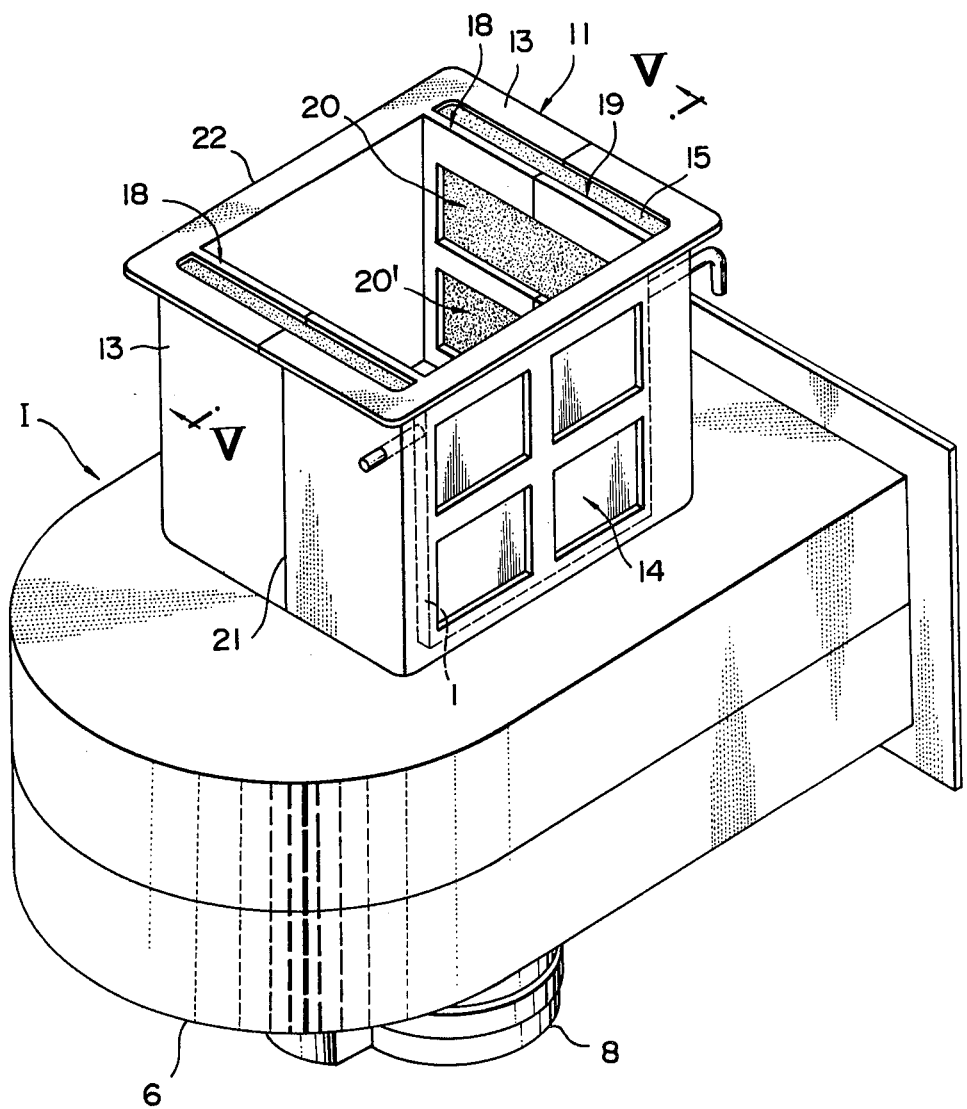
FIG. 4 is a perspective view showing the sound absorber supporting structure according to a first embodiment of the present invention.
Figure 5:
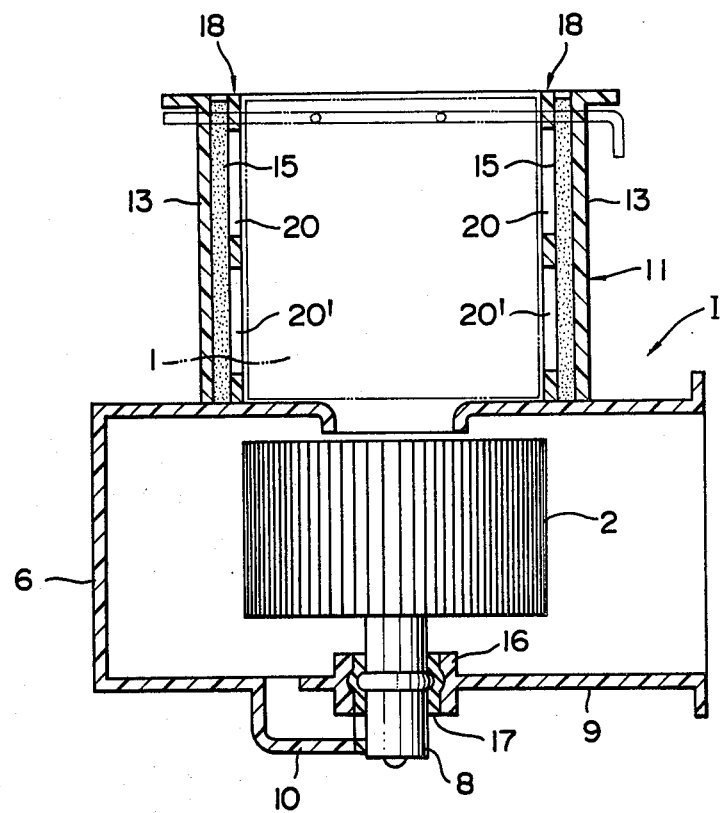
FIG. 5 is a sectional view taken along the lines V—V of FIG. 4.

Referring to FIGS. 4 and 5, there is shown an air intake box I incorporating the sound absorber supporting structure according to an embodiment of the present invention, which includes an inside air—outside air changeover unit 1 adapted to permit inside air or outside air to be selectively admitted to the vehicle compartment by means of an air intake door 1, and a blower housing 6 accommodating a blower 2 therein, as is the case with the prior art. A motor 8 for driving the blower 2 is securely mounted, through a ring-like rubber membrane 17, on a blower bracket 16 which is integral with bottom wall 9 of the blower housing 6. A motor cooling duct 10, which is formed by shaping a part of the bottom wall 9 into a cylindrical form, is connected at the front end thereof to the side of the motor 8.

In the inside air—outside air changeover unit 11, a pair of retainer members 18, 18 of an identical shape are provided along the side walls 13, 13 on the left and right hand sides of inside air inlet ports 14 in such a manner as to ensure no interference with the changeover operation of the air intake door 1. More specifically, the retainer members 18, 18 are provided in substantially parallel relationship to the left and right hand side walls 13, 13 in such a manner as to define gaps 19 therebetween in which the sound absorbers 15 are fitted, each of the retainer members 18, 18 including a retaining wall formed with two, upper and lower, openings 20 and 20'. The retaining wall of each retainer member 18 may be molded integrally with the inside air—outside air changeover unit 11, which may comprise two channel-like members joined together as shown by the line 21 in FIG. 4.

In the inside air—outside air changeover unit 11 provided with the aforementioned sound absorber supporting structure, plate-like sound absorbers 15 are inserted in the gaps 19 defined between the left and right hand side walls and the retaining walls of the retainer members 18, so that the sound absorbers 15 are disposed in substantially tight contact with the inner surfaces of the left and right hand side walls 13 and retained in position under the action of the retaining walls thereof. If it is desired to remove the sound absorbers 15 to replace them, this can readily be done simply by pulling the sound absorbers 15 out of the gaps 19. Although in this embodiment, the sound absorbers 15, 15 are provided only with respect to the left and right hand side walls 13, 13 of the inside air—outside air changeover unit 11, it is also possible that a similar sound absorber may be provided with respect to a rear side wall as well and retained in position by means of a retaining member provided with respect thereto.

Figure 6:
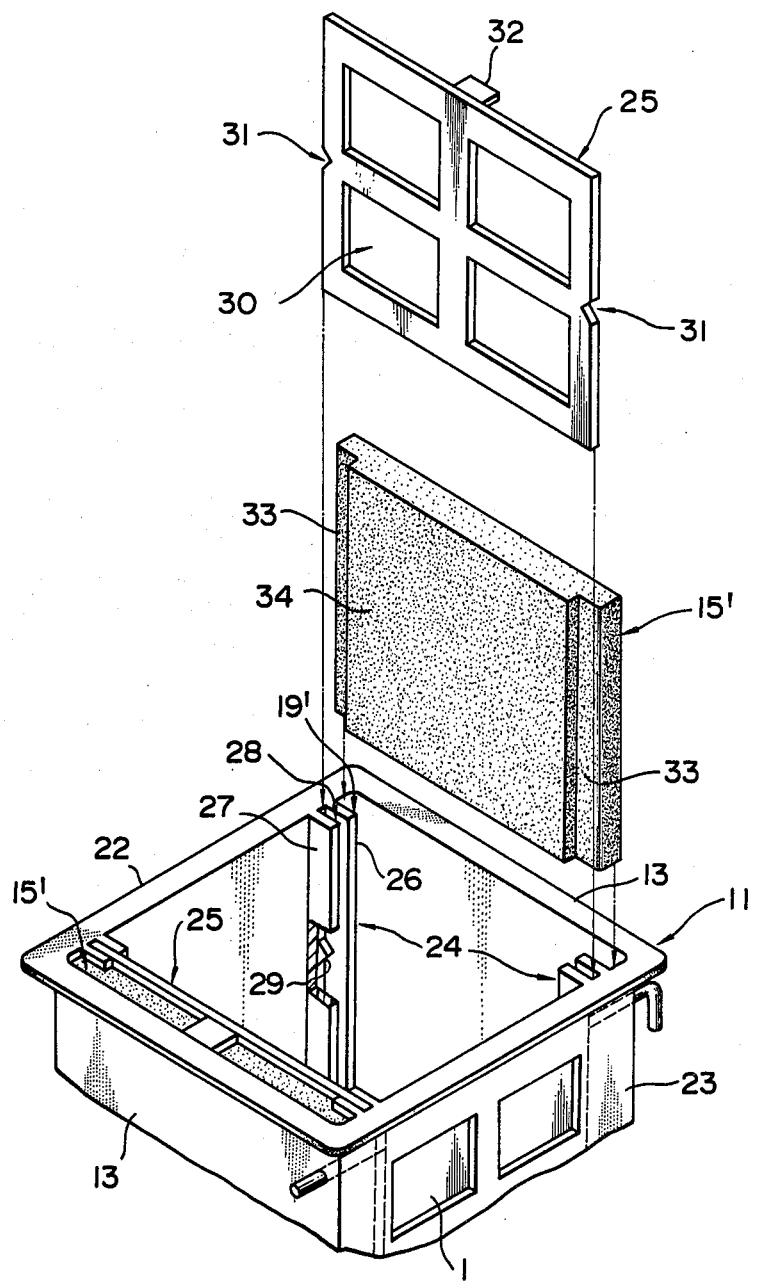
FIG. 6 is a perspective view showing the sound absorber supporting structure according to a second embodiment of the present invention.

Referring to FIG. 6, there is shown another embodiment of the present invention, wherein sound absorbers are more securely retained in position. More specifically, the sound absorber supporting structure according to this embodiment comprises a pair of opposing guides 24, 24 provided on front side wall 13 and rear side wall 22 of an inside air—outside air changeover unit 11 in such a manner as to extend along the inner surfaces of the left and right hand side walls of the unit 11; and retainer plates 25 adapted for engagement with the guides. Each of the guides 24 is comprised of two, inner and outer, parallel projections 26 and 27 extending from the top end to the bottom end of the wall onto which respective one of the sound absorbers is to be mounted. Guide channels 28 in which the retainer plates 25 are to be inserted, are defined between the inner and outer projections 26 and 27, and gaps 19' in which the sound absorbers 15' are to be inserted, are defined between the inner surface of projection 26 and the inner surfaces of the walls 13. Furthermore, each of the guide channels 28 is provided at an intermediate point with an engagement projection 29 which is adapted for anchoring the retainer plate 25. Each of the retainer plates 25 is comprised of a generally rectangular frame-like member formed with check-like openings 30 and having a recess 31 formed in each of the opposite side portions thereof, the recesses 31 being adapted for engagement with the respective projections 29 of the retainer plates 25 respectively. In addition, each of the retainer plates 25 is provided at the top thereof with a keep plate 32 for preventing withdrawal of the respective sound absorbers 15'. In this embodiment, each of the sound absorbers has its intermediate portion 34 made to be thicker than its opposite side portions 33, 33. The side portions 33, 33 of the retainer plates 25 are inserted in the gaps 19' of the guides 24, and when retainer plates 25 are inserted, the intermediate portion of each sound absorber 15' becomes substantially flush with the inner projections 26 of each guide 24.

Thus, in an attempt to mount the sound absorbers 15' in the inside air—outside air changeover unit 11 provided with the aforementioned support structure, each of the sound absorbers 15' is pushed down with the opposite side portions 33 thereof inserted in the gaps 19' so that sound absorbers 15' are brought into close contact with the inner surfaces of the left and right hand side walls 13 respectively. Although even under this condition the sound absorbers 15' are supported in close contact with the inner surfaces of the walls 13 through their engagement with the guides 24, more positive support of the sound absorbers 15' can be achieved as the result of the recesses 31 of the retainer plates 25 being disposed in engagement with the projections 29 provided in the guide channels 28, while at the same time, the sound absorbers 15' can be prevented from being withdrawn, under the action of the keep plates 32 provided on the retainer plates 25. If it is desired to replace any of the sound absorbers 15', this can readily be done simply by removing the retainer plate 25 by pulling up its keep plate 32 and subsequently pulling up the sound absorber 15'. In this embodiment, too, it is possible that additional retaining means may be provided with respect to the rear wall 22 of the inside air—outside air changeover unit 11 and that a sound absorber may be retained by such additional retainer means.

As will be appreciated from the foregoing discussion, according to the present invention, sound absorbers are securely retained in position by means of retainer means provided in association with the side walls of an inside air—outside air changeover unit in an air intake box, thereby making it possible to avoid the problem that the sound absorbers tend to peel off or slide off as in the prior art. In addition, mounting and replacement of sound absorbers can be carried out more easily than in the case where such sound absorbers are attached by using adhesive agent as in the prior art.

While the present invention has been described and illustrated with respect to specific embodiments, it is to be understood that the present invention is by no means limited thereto but covers all changes and modifications which will become possible within the scope of the appended claims.

What is claimed is:

1. A sound absorber supporting structure for an air intake box of an automotive air conditioner, comprising sound absorber retaining means provided in association with each of at least two opposite side walls of an inside air—outside air changeover unit in said air intake box, thereby securely retaining, in position between said side walls and said retaining means, sound absorbers removably inserted along said side walls, wherein said sound absorber retaining means comprises:

a pair of guide means, each extending along one of said opposite side walls, each of said pair of guide means comprising a first and a second wall disposed in a spaced parallel relationship with each other so that a guide channel is defined therebetween, each of the second walls being disposed in such a manner that a gap is defined between each said second wall and a respective one of said side walls so that one of said sound absorbers may be removably inserted into each gap; and a pair of retainer plates adapted so that one may be inserted into each of said guide channels.

2. A sound absorber supporting structure as set forth in claim 1, wherein each of said guide channels is provided with a projection; and each of said retainer plates is formed with a recess adapted to be engaged with the projection of a respective one of said guide channels when said retainer plates are inserted in said guide channels respectively.

3. A sound absorber supporting structure as set forth in claim 2, further comprising means provided on said retainer plates for preventing withdrawal of the sound absorbers inserted in said gaps.

4. A sound absorber supporting structure as set forth in claim 3, wherein said means comprises keep plates provided at the top of said retainer plates respectively.

5. A sound absorber suporting structure as set forth in claim 4, wherein each of said sound absorbers is shaped so that an intermediate portion thereof is greater in thickness that the opposite side portions thereof, said sound absorbers being adapted to be inserted in said gaps at the opposite side portions thereof, and also adapted, when inserted in said gaps, so that said intermediate portions thereof become substantially flush with the second walls of said guide means.

6. A sound absorber supporting structure as set forth in claim 3, wherein each of said sound absorbers is shaped so that an intermediate portion thereof is greater in thickness than the opposite side portions thereof, said sound absorbers being adapted to be inserted in said gaps at the opposite side portions thereof, and also adapted, when inserted in said gaps, so that said intermediate portions thereof become substantially flush with the second walls of said guide means.

7. A sound absorber supporting structure as set forth in claim 2, wherein each of said sound absorbers is shaped so that an intermediate portion thereof is greater in thickness than the opposite side portions thereof, said sound absorbers being adapted to be inserted in said gaps at the opposite side portions thereof, and also adapted, when inserted in said gaps, so that said intermediate portions thereof become substantially flush with the second wall of said guide means.

8. A sound absorber supporting structure as set forth in claim 1, further comprising means provided on said retainer plates for preventing withdrawal of the sound absorbers inserted in said gaps.

9. A sound absorber supporting structure as set forth in claim 8, wherein said means comprises keep plates provided at the top of said retainer plates respectively.

10. A sound absorber supporting structure as set forth in claim 9, wherein each of said sound absorbers is shaped so that an intermediate portion thereof is greater in thickness than the opposite side portions thereof, said sound absorbers being adapted to be inserted in said gaps at the opposite side portions thereof, and also adapted, when inserted in said gaps, so that said intermediate portions thereof become substantially flush with the second walls of said guide means.

11. A sound absorber supporting structure as set forth in claim 8, wherein each of said sound absorbers is shaped so that an intermediate portion thereof is greater in thickness than the opposite side portions thereof, said sound absorbers being adapted to be inserted in said gaps at the opposite side portions thereof, and also adapted, when inserted in said gaps, so that said intermediate portions thereof become substantially flush with the second walls of said guide means.

12. A sound absorber supporting structure as set forth in claim 1, wherein each of said sound absorbers is shaped so that an intermediate portion thereof is greater in thickness than the opposite side portions thereof, said sound absorbers being adapted to be inserted in said gaps at the opposite side portions thereof, and also adapted, when inserted in said gaps, so that said intermediate portions thereof become substantially flush with the second walls of said guide means.

* * * * *